W. J. KENT.
APPARATUS FOR CUTTING BLANKS.
APPLICATION FILED JAN. 10, 1918.
1,332,848.
Patented Mar. 2, 1920.
2 SHEETS—SHEET 1.
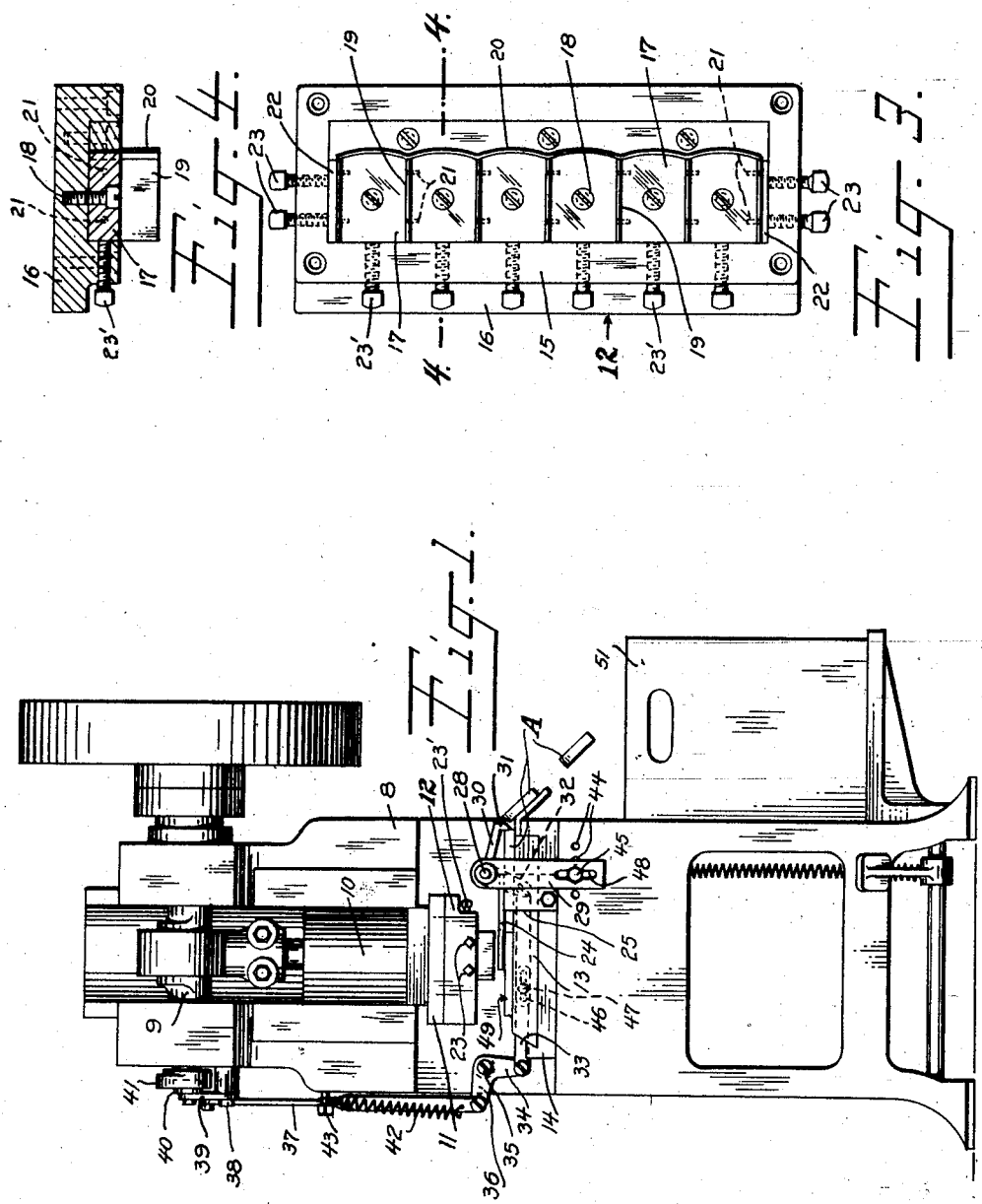
Witness:
S. F. Taylor.
Inventor.
William J. Kent,
By his
Ernest Hopkins
Attorney.

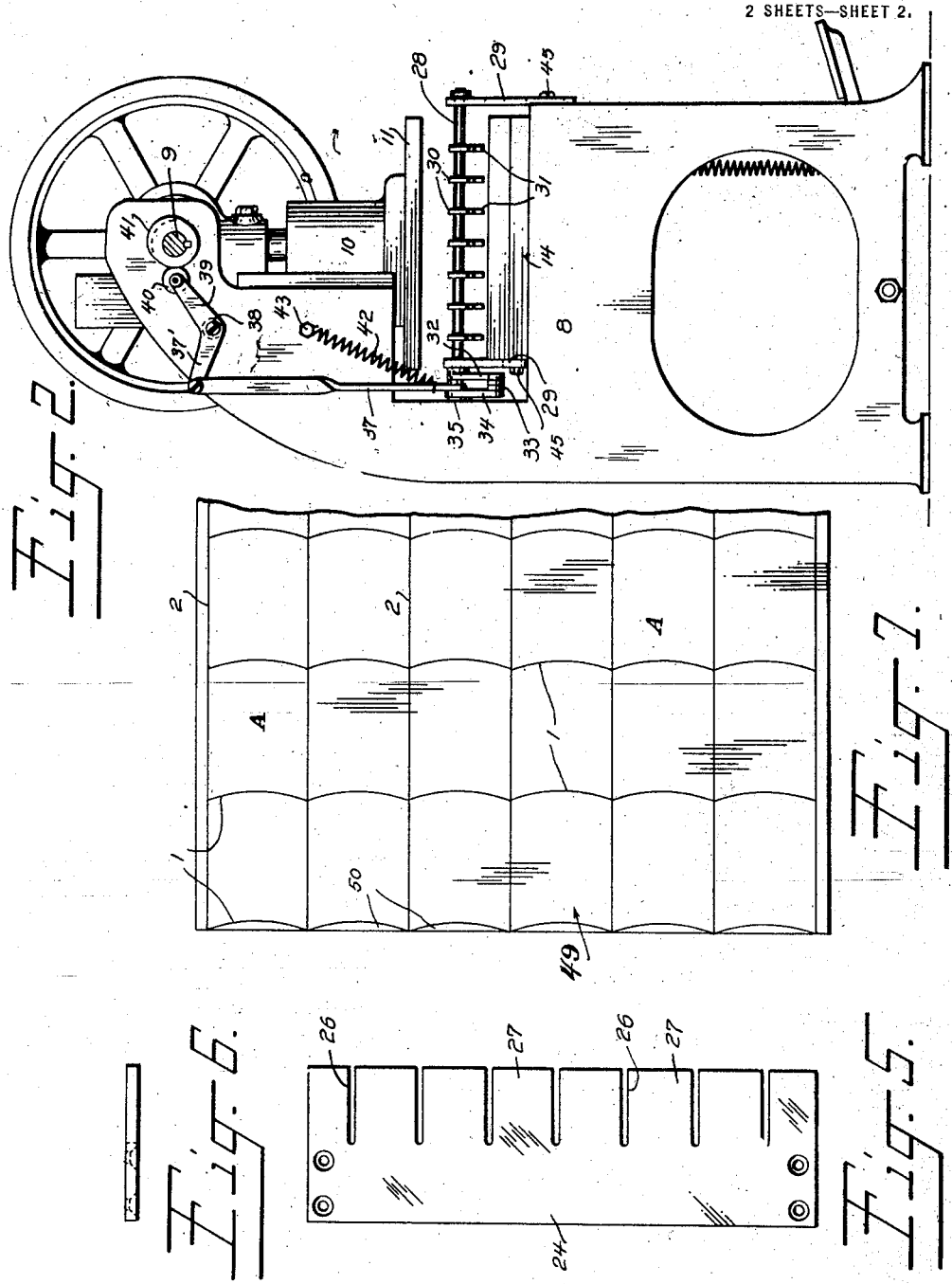

UNITED STATES PATENT OFFICE.

WILLIAM J. KENT, OF BROOKLYN, NEW YORK, ASSIGNOR TO REVERE RUBBER COMPANY, A CORPORATION OF RHODE ISLAND.

APPARATUS FOR CUTTING BLANKS.

1,332,848. Specification of Letters Patent. Patented Mar. 2, 1920.

Original application filed October 11, 1917, Serial No. 195,880. Divided and this application filed January 10, 1918. Serial No. 211,270.

*To all whom it may concern:*

Be it known that I, WILLIAM J. KENT, a citizen of the United States, residing in the borough of Brooklyn, city of New York, county of Kings, and State of New York, have invented certain new and useful Apparatus for Cutting Blanks, of which the following is a full, clear, and exact description.

This invention relates to blank cutting apparatus, and more particularly to apparatus primarily adapted for cutting sheets of vulcanizable material into blanks, such, for example, as heel blanks. Heretofore in preparing rubber heel blanks it has been customary to cut them substantially D-shape, from a sheet of suitable material. The waste entailed by this method is large as it is necessary to leave intervening portions of material between each blank of sufficient area to withstand the die pressure without distortion of the sheet in the vicinity of the die, and also since the curved sides of the die prevent the various incisions from being even approximately adjacent throughout.

An object of the present invention, accordingly, is to provide an apparatus adapted to automatically cut a sheet of vulcanizable plastic material into blanks in such a manner that the wastage of material heretofore encountered will be obviated.

Another object of the invention is to provide a mechanism for automatically gaging the quantity of material fed beneath the die prior to each cutting stroke and for alining the material in position beneath the die.

A further object of my invention is to provide a gang die adapted to cut a series of blanks at a single operation without wastage of material.

Other objects of my invention will hereinafter appear.

This application is a division of my copending application, Serial No. 195,880, filed October 11, 1917.

In the accompanying drawings wherein one of the various possible embodiments of the invention is shown:

Figure 1 represents a front elevation of my improved blank cutting apparatus, a sheet of material in the process of cutting being shown.

Fig. 2 is a side elevation of the apparatus shown in Fig. 1, certain parts being omitted to disclose more clearly the automatic gaging and alining mechanism.

Fig. 3 is an enlarged view of the gang die employed in connection with the apparatus shown in Fig. 1.

Fig. 4 is a cross sectional view of the gang die, taken on the line 4—4 of Fig. 3.

Fig. 5 is a detail plan view of the stripper employed for ejecting the blanks from the die.

Fig. 6 is an end view of the stripper shown in Fig. 5.

Fig. 7 is a plan view of a sheet of rubber which has been cut into blanks by my apparatus.

For the purpose of giving a clear understanding of my invention, I shall describe the same in connection with the manufacture of rubber heels, although it is to be understood that my apparatus may be employed for preparing blanks of any desired character. In cutting the blanks I employ a die so shaped that at a single operation two series of incisions are made, one consisting of substantially parallel straight incisions, the other of curved incisions, each of the curved incisions being so disposed that its extremities meet the extremities of two parallel incisions. Thus, by a single cutting operation of the die, three sides of a series of heel blanks extending substantially from edge to edge of the sheet of material are cut. Upon making the first incisions the sheet is advanced until the extremities of the parallel incisions opposite to those joined by the curved incisions are in a position to be joined by curved incisions identical to the first mentioned curved incisions, when the die is again lowered. In other words, the die cuts one curved and two parallel sides of each blank at the first operation and the fourth side of the blanks is completed by the incision made by the same curved portion of the die which made the first curved incision. Each of the blanks, A, so cut is a counterpart of the others and has two parallel sides joined by two correspondingly curved ones. The arrangement of the incisions is shown in Fig. 7 in which 1 indicates the curved incisions and 2 indicates the straight parallel ones. The cutting operations of the die are continued until the entire sheet has been cut into identical blanks. From the foregoing it will be seen that I am enabled to cut the entire sheet into blanks without wastage of material.

The apparatus which is preferably employed in cutting the blanks comprises a press having a frame 8 and a shaft 9 which drives a reciprocating plunger 10 carrying a head 11, to which is secured a preferred form of gang die 12 adapted to be moved toward and away from a block 13 mounted on the bedplate 14 of the press. The die comprises a chase 15 of substantially rectangular outline, having a base 16 upon which are mounted a series of spacing-blocks 17 secured to the base by screws 18. Supported between the spacing blocks is a series of thin substantially straight cutting members 19 placed in parallel relation to one another and adapted to provide the parallel incisions 2 in the sheet of material. These cutting members are equally spaced from one another and extend from side to side of the chase. Their extremities at one side of the chase are joined by another cutting member 20 formed with a series of curves, each curve passing from one of the straight cutting members to the next adjacent one. This curved cutting member serves to make the curved incisions 1 in the sheet of material.

The parallel cutting members 19 are held in place in the chase by dowel pins 21 carried by the spacing-blocks 17. These pins pass through suitable openings in the cutting members 19 and enter recesses provided in the blocks. Interposed between the extreme cutting members and the ends of the chase are spacing-plates 22, each of which is provided with dowel pins 21 adapted to pass through the adjacent cutting member and enter suitable recesses formed in the adjacent spacing block.

As an additional means of securing the cutting members 19 and 20 in place set screws are provided. Two of these screws 23 are arranged at each end of the chase and when tightened operate to force the spacing-blocks 17 and plates 22 into clamping engagement with the parallel cutting members 19. A series of the screws 23' is also arranged at one side of the chase, one screw being provided for each of the spacing blocks. These screws operate when tightened to force the spacing blocks forward so as to clamp the curved cutting member 20 firmly against the adjacent wall of the chase cavity.

In order to eject the heel-blanks from the die after they are cut a stripper 24 supported by a bracket 25 attached to the press is provided. This stripper comprises a rectangular metal plate formed at one side with a series of parallel slits 26 and a series of fingers 27. The slits 26 are shaped to permit the passage of the parallel cutting members 19 of the die therethrough, while the fingers 27 are adapted to lie within the blank cavity when the die is lowered and to force the heel-blank therefrom when the die is raised.

The material to be cut may be manually fed to the die, or if desired suitable mechanism may be provided for the purpose. In my pending application, Serial No. 173,830, filed June 9, 1917, I have disclosed one type of feed mechanism adapted for use with the apparatus herein described.

In cutting the blanks it is highly desirable that each one be made an exact counterpart of the others so that when they are molded and vulcanized a uniform product will be obtained. To achieve this result an automatic mechanism is provided adapted to gage the amount of material fed beneath the die prior to each cutting stroke, to aline the material in position beneath the die, and to hold it securely against movement during the cutting stroke.

This mechanism comprises a shaft 28 extending transversely across the bed of the press rearwardly of the die and mounted for oscillatory movement in suitable supports 29 secured to the press in a manner to be hereinafter set forth. Carried by the shaft is a series of dogs 30 which are raised and lowered at each oscillation thereof. When the dogs are lowered their claws 31 engage the front edge of the adjacent series of blanks thereby holding the material being fed to the die against movement. When the dogs are raised the claws 31 are disposed in a position permitting the cut blanks to pass thereunder and consequently the sheet of material to be fed beneath the die. The operation of the dogs is so regulated that they will be in their lowered position during each cutting stroke of the press and in their raised position a sufficient interval of time to permit the passage thereunder of one series of cut blanks. The amount of material fed beneath the die prior to each cutting stroke will thus be regulated to that required for the production of one series of blanks. It is to be noted that the dogs also serve to aline the material in position beneath the die and to hold it against displacement during the cutting stroke thereof.

Oscillatory movement is imparted to the dog shaft 28 by the main shaft 9 of the press by means of the following train of mechanism; attached to one end of the dog shaft is an arm 32, to the lower end of which is pivoted one end of a rod 33. The other end of the rod 33 is pivoted to one arm 34 of a bell crank lever pivoted at 35 to the press. The other arm 36 of the lever is pivoted to one end of a rod 37 twisted at right angles intermediate its length. The opposite end of the rod 37 is pivoted to one arm 37' of a bell crank lever pivoted at 38 to the frame of the press. The other arm 39 of the lever is provided with a roller 40 adapted to engage a cam 41 carried by the shaft 9 of the press. The mechanism described operates at each rotation of the shaft 9 to oscillate the dog shaft 28 in a manner to raise and lower the dogs 30 in synchronism with the raising and lowering of the die. A coil spring 42 is provided to maintain the roller 40 in contact with the cam 41. One end of this spring is secured to the lower portion of the rod 37, and the other end is fastened to a bolt 43 attached to the press.

In order to provide for cutting blanks of various lengths and thicknesses the engaging and alining mechanism is made adjustable. To this end a series of bolt holes 44 arranged in substantially the same horizontal plane is provided for the retaining bolt 45 of each of the dog shaft supports 29. These holes are adapted to selectively receive the retaining bolts thus permitting the supports to be moved toward or from the die to adjust the position of the dog shaft in accordance with the length of the blanks it is desired to cut. To provide for adjusting the driving mechanism in accordance with the various adjustments of the dog shaft the rod 33 thereof is constructed of two members bolted together end to end in a manner permitting the length of the rod to be varied as desired. One of the members of the rod is provided with a slot 46 which receives the bolt 47 secured to the other member. Provision is also made for adjusting the dog shaft bodily in a vertical direction to adapt it for use with blanks of various thicknesses. To this end its supports 29 are each provided with a slot 48 adapted to receive the retaining bolt 45.

The operation of the apparatus is as follows, it being understood that the dogs are raised and lowered in unison with the raising and lowering of the die: A sheet of material 49 to be cut into blanks is fed beneath the die a sufficient distance so that at the first cutting stroke the die will cut the curved portions 50 (see Fig. 7) away from the sheet, thus forming one of the curved sides of a series of blanks. From this point onward the sheet is fed beneath the die prior to each cutting stroke, a distance corresponding to the length of the blanks it is desired to cut. When two series of blanks have been cut and the material is advanced preparatory to cutting a third series the forward edge of the first series will contact with the claws 31 of the dogs upon the insertion beneath the die of the exact amount of material required for the production of the third series. After the third series has been cut the dogs will be raised for a sufficient interval of time to permit the first series to be advanced beyond the claws 31; whereupon the dogs will be lowered to limit the amount of material being fed to the die to that required for the production of a fourth series of blanks. The operations set forth are continued until the entire sheet has been cut into blanks. It is evident from the foregoing that the amount of material fed beneath the die prior to each cutting stroke will be accurately limited to that required for the production of one series of blanks. When the blanks have passed beyond the claws 31 of the dogs they fall into a receptacle 51 provided for their collection.

While I have described one of the preferred embodiments of my invention, it is to be understood that various modifications may be resorted to within the scope of the appended claims without departing from the spirit or sacrificing any of the advantages of the invention.

Having thus described my invention, what I desire to protect by Letters Patent is:

1. In an apparatus of the kind described in combination, a chase, a gang die inclosed thereby comprising a series of spaced substantially straight cutting edges, the series extending from side to side of the chase, a continuous cutting edge provided with a series of curves each curve passing from one of the straight cutting edges to the next adjacent one, a plurality of blocks adapted to space the straight cutting edges from one another, and screws mounted on the chase adapted to clamp the said cutting edges in position.

2. In an apparatus of the kind described in combination, a bed to support material to be cut and blanks cut therefrom, a cutting die, means for reciprocating said die, and means disposed to the rear of said die, said means being adapted to automatically oscillate in synchronism with the reciprocation of said die to intermittingly intercept the progress of blanks along said bed, whereby the amount of material fed beneath the die prior to each cutting stroke is accurately limited to a uniform quantity.

3. In an apparatus of the kind described in combination a die adapted to cut blanks from a sheet of material, means for reciprocating said die, means disposed to the rear of said die, said means being adapted to automatically oscillate in synchronism with the reciprocation of said die to gage the amount of material fed to the die prior to each cutting stroke thereof, and means whereby said latter means may be adjusted horizontally toward and from the die to provide for cutting different size blanks.

4. In an apparatus of the kind described in combination, a die adapted to cut blanks from a sheet of material, means for reciprocating said die, means disposed to the rear of said die and adapted to automatically oscillate in synchronism with the reciprocation of said die and engaging the blanks to gage the amount of material fed to the die prior to each cutting stroke thereof and to aline the material in position to be cut, and means whereby said last means may be vertically adjusted to provide for different thicknesses of blanks.

5. In an apparatus of the kind described in combination, a bed to support material to be cut and blanks cut therefrom, a driving shaft, a cutting die adapted to be reciprocated by said shaft, means for intercepting the progress of blanks along said bed, said means being disposed to the rear of said die and adapted for horizontal and vertical adjustment, and mechanism actuated by said shaft for intermittingly disposing said means in an intercepting position.

6. An apparatus of the kind described in combination, a bed to support material to be cut and blanks cut therefrom, a gang die comprising a series of cutting edges providing adjoining blank cavities having substantially straight parallel sides and a stationary stripper member having spaced fingers adapted to enter the blank cavities of the die when the die is lowered, means for reciprocating said die, and means disposed to the rear of said die and adapted to automatically oscillate in synchronism with the reciprocation of said die to intermittingly intercept the progress of blanks along said bed, whereby the amount of material fed beneath the die prior to each cutting stroke is accurately limited to a uniform quantity.

7. In an apparatus of the kind described, means for cutting a sheet of material transversely into series of blanks adjoining each other at all points, and means automatically operated in synchronism with the cutting means for engaging a series of said blanks to gage the amount of material to be fed and properly aline it transversely.

8. In an apparatus of the kind described, means for cutting a sheet of material into strips parallel to its length, means operating transversely of said strips for cutting them into blocks, and adjustable automatic means for intermittently engaging the blocks to gage the amount of material fed.

9. In an apparatus of the character described, a bed across which the material may be advanced, an intermittently operating blank cutting die coöperating therewith having front and side cutting edges and an open rear edge, whereby as the material is advanced the front cutting edge simultaneously forms the rear side of a preceding blank and the front of a succeeding one, and automatic gage means operating in synchronism with the die for determining the length of feed of the material.

10. In an apparatus of the character described, a bed across which the material may be advanced, an intermittently operating blank cutting die coöperating therewith having parallel cutting edges in the direction of travel of the material, a transverse cutting edge connecting the parallel edges at one end, the other ends being open whereby as the material is advanced the transverse cutting edge simultaneously forms adjacent sides of two blanks, and means for determining the length of feed of the material.

11. In an apparatus of the character described, a bed across which the material may be advanced, an intermittently operating blank cutting die coöperating therewith having parallel cutting edges in the direction of travel of the material, a transverse cutting edge connecting the parallel edges at one end, the other ends being open whereby as the material is advanced the transverse cutting edge simultaneously forms adjacent sides of two blanks, and a stripper extending through said open side during the initial retracting movement of the die.

Signed at New York city, this 17th day of December, 1917.

WILLIAM J. KENT.